United States Patent
Thielemans et al.

(10) Patent No.: US 7,205,729 B2
(45) Date of Patent: Apr. 17, 2007

(54) CONTROL SYSTEM AND METHOD FOR CONTROLLING LIGHTING AND VIDEO DEVICES

(75) Inventors: Robbie Thielemans, Nazareth (BE); Patrick Willem, Oostende (BE); Gino Tanghe, Merkem (BE)

(73) Assignee: BARCO, naamloze vennootschap (BE)

(*) Notice: Subject to any disclaimer, the term of this patent is extended or adjusted under 35 U.S.C. 154(b) by 0 days.

(21) Appl. No.: 11/052,053

(22) Filed: Feb. 8, 2005

(65) Prior Publication Data

US 2006/0076906 A1   Apr. 13, 2006

Related U.S. Application Data

(60) Provisional application No. 60/616,200, filed on Oct. 7, 2004.

(51) Int. Cl.
*H05B 37/02* (2006.01)

(52) U.S. Cl. ..................... 315/292; 315/312

(58) Field of Classification Search ........ 315/292–294, 315/312, 316, 318; 353/85; 362/85, 227, 362/230
See application file for complete search history.

(56) References Cited

U.S. PATENT DOCUMENTS

| | | | |
|---|---|---|---|
| 6,219,099 B1* | 4/2001 | Johnson et al. | 348/383 |
| 6,331,756 B1* | 12/2001 | Belliveau | 315/316 |
| 6,605,907 B2* | 8/2003 | Belliveau | 315/294 |
| 6,812,653 B2* | 11/2004 | Bellivean | 315/318 |
| 6,869,193 B2* | 3/2005 | Belliveau | 353/122 |
| 6,930,456 B2* | 8/2005 | Belliveau | 315/318 |

OTHER PUBLICATIONS

U.S. Appl. No. 11/052,053, filed Feb. 8, 2005.
U.S. Appl. No. 11/052,058, filed Feb. 8, 2005.
U.S. Appl. No. 11/052,057, filed Feb. 8, 2005.
U.S. Appl. No. 11/052,056, filed Feb. 8, 2005.
U.S. Appl. No. 11/052,055, filed Feb. 8, 2005.
U.S. Appl. No. 11/052,054, filed Feb. 8, 2005.

* cited by examiner

*Primary Examiner*—Thuy Vinh Tran
(74) *Attorney, Agent, or Firm*—Bacon & Thomas PLLC

(57) ABSTRACT

A control system for lighting and video devices, wherein said control system includes at least one video device; at least one lighting device; and a software protocol, capable of communicating three different protocols, such as a digital video/data protocol, a common lighting protocol and a data protocol to the video and lighting devices.

28 Claims, 9 Drawing Sheets

CONTROL SYSTEM AND METHOD FOR CONTROLLING LIGHTING AND VIDEO DEVICES

This application claims the benefit of provisional application Ser. No. 60/616,200 filed Oct. 7, 2004 under 35 U.S.C. 119(e).

BACKGROUND OF THE INVENTION

1. Field of the Invention

The present invention relates to digital control of lighting and video devices. In particular, the present invention relates to a system and a software protocol which controls lighting and video devices with the same control system.

2. Discussion of the Related Art

High-intensity light sources, such as incandescent fluorescent, and halogen lighting devices, have long been used in many large-scale applications, such as large public information displays, outdoor stadium displays, and theatrical lighting systems.

Originally, large manually-operated switches and dimmers were located near the lighting devices to control the illumination of many large-scale lighting applications. Later, lighting devices were remotely operated by use of electronic dimmers that employed a low voltage direct current (DC) to control the lighting devices' high-voltage power.

This DC control voltage ran on long individual wires to control individual lighting devices. This 'analog' system, although outmoded, is still widely used today.

Most recently, however, digitally controlled illumination systems have been developed in which a network of individual lights is controlled by a central computer controlled console. Such illumination systems are widely used today in, for example, theatrical lighting systems.

In 1986, the U.S. Institute of Theatre Technology (USITT) developed the DMX512-protocol as a standard digital interface between dimmers and computer control consoles. In the DMX512-protocol, each lighting device has a digital address and responds to the digital commands sent on a control cable to this address. A lighting device may possess multiple addresses. For example, a color changing light may have one address to set the mode of the lighting device (on/off/sound activated), another address to select the color and a third address to set the speed at which it changes the color. More than one light may be set to the same address. In this way, multiple lights may be simultaneously controlled in an identical Wanner by use of only one DMX512-address. The DMX512-protocol is capable of controlling up to 512 addresses per each lighting group that is referred to as a "universe."

The DMX512-protocol was originally developed to control theatrical lighting dimmers, including a variety of lighting effects, such as color changes, light motion, fog machines and laser displays, but it is now being used in many other applications. Some light sources are specifically designed to work with the DMX512-standard, although most lighting devices can be made to work according to the standard by using DMX512 dimmer modules. The DMX512-protocol has allowed uniformity in programming digital lighting; however, a custom hardware setup that uses a variety of lighting devices is often created each time a lighting system is needed.

Often, the lighting devices have different power requirements; in some cases, they require external regulation; in other cases, they require high voltage unregulated power supplies. Thus, what is needed is a lighting protocol which can communicate and control both DMX512-lighting devices and custom lighting devices which are not DMX512 compatible.

Further, the DMX512-protocol is a simplex communication protocol which only allows one communication between the control station and the lighting device. Simplex communication prohibits the lighting devices from providing feedback to the control station; lighting devices could feedback, for example, device identification, servicing needs and location. What is needed, is a lighting protocol which provides full duplex communication between the control station and the lighting devices.

Additionally, with the advancement of technology, many commercial events are also demanding digital control over video display devices as well as DMX512-lighting devices and custom lighting devices. Controlling video display devices necessitates having digital controllers compatible with the video devices. However, current digital video controllers are not compatible with current DMX512 lighting device digital controllers. As a result, multiple control stations are needed to operate the video devices, the DMX512 lighting devices and the custom lighting devices.

What is needed, is a means of digitally controlling DMX512 lighting devices, custom lighting devices and video devices within one digital control system. U.S. Pat. No. 6,605,907 entitled, "Method, Apparatus And System For Image Projection Lighting," details a method and a system of digitally controlling DMX512-lighting devices and lighting devices that have image projection capabilities. However, U.S. Pat. No. 6,605,907 fails to provide a means of digitally controlling video displays.

U.S. Pat. No. 6,605,907 also necessitates multiple channels for digitally controlling the lighting and video devices. What is needed, is a means of digitally controlling DMX512-lighting devices, custom lighting devices and video display and projection devices over the same communications channel.

SUMMARY OF THE INVENTION

It is therefore an object of this invention to provide a lighting protocol which can communicate and control both DMX512-lighting devices and custom lighting devices which are not DMX512 compatible.

It is another object of this invention to provide a lighting protocol which provides full duplex communication between the control station and the lighting devices.

It is yet another object of this invention to provide a means of digitally controlling DMX512 lighting devices, custom lighting devices and video devices within one digital control system.

It is yet another object of this invention to provide a means of digitally controlling DMX512-lighting devices, custom lighting devices and video display and projection devices over the same communications channel.

The present invention relates to digital control of lighting and video devices. In particular, the present invention relates to a system and a software protocol which controls lighting and video devices with the same control system.

The present invention lists four embodiments of systems which provide four different protocols for lighting and video devices.

The object of the invention is a control system for lighting and video devices and a method for controlling lighting and video devices, which does not have the above mentioned and other disadvantages.

To this aim the present invention relates to a control system for lighting and video devices, wherein said control system comprises:
- at least one video device;
- at least one lighting device; and
- a software protocol, capable of communicating three different protocols, such as a digital video/data protocol, a common lighting protocol and a data protocol to said video and lighting devices.

Preferably said three protocols are communicated through three different channels, each over a different cable, namely over a video cable and a data cable, connected to said video device and over a lighting cable, which is connected to said lighting device and optionally to said video device.

The present invention also relates to a method for controlling lighting and video devices within the same three-protocol control system, wherein a software protocol is used, which is capable of communicating three different protocols to said lighting and video devices, such as a first data protocol, a second common lighting protocol and a third video/data protocol.

Preferably said protocols are communicated through three separate channels.

In an advantageous form of embodiment of a method according to the invention, the data protocol is split into a basic data protocol and a special data protocol, which protocols are communicated over two different channels, whereby said basic data protocol is transmitted through the channel of the common lighting protocol and is transmitted in between the common lighting protocol commands and whereby said special data protocol is transmitted through the video/data channel and is transmitted during vertical blanking interval (VBI) of the video/data protocol commands.

In a particular form of embodiment of a method according to the invention, the video/data and data protocol commands are communicated through the channel of the common lighting protocol, at a higher frequency than the common lighting protocol commands.

Preferably said data protocol is communicated to a plurality of video devices and a plurality of lighting devices, whereby the data protocol is being translated in a common lighting protocol for the lighting devices through an adapter.

BRIEF DESCRIPTION OF THE DRAWINGS

With the intention of better showing the characteristics of the invention, hereafter, as an example without any limitative character, several preferred forms of embodiment of a control system according to the invention for video and lighting devices are described, with reference to the accompanying drawings, wherein.

DESCRIPTION OF SEVERAL PREFERED EMBODIMENTS

Figure 1A:
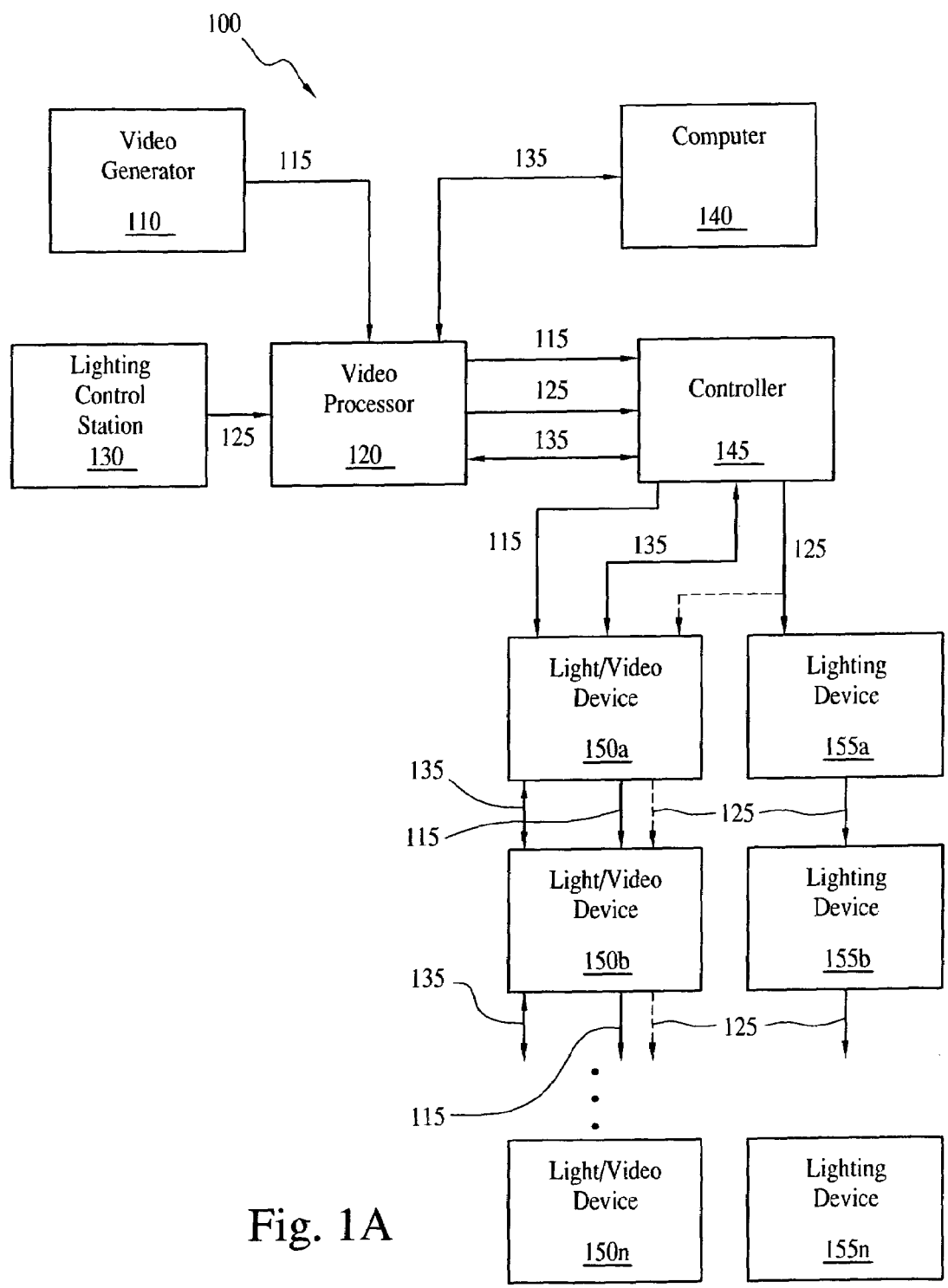
FIG. 1A illustrates a three-protocol, three-channel lighting and video system in accordance with the invention.

FIG. 1A illustrates a three-protocol, three-channel lighting and video system 100, which includes a video generator 110, a video processor 120, a lighting control station 130, a computer 140, a controller 145, a plurality of light/video devices 150 (i.e., light/video device 150a through 150n), a plurality of lighting devices 155 (i.e., lighting device 155a through 155n) up to a maximum of 512 devices per lighting control station 130 and a plurality of communication cables (i.e., video cables 115, lighting cables 125 and data cables 135).

Video generator 110 and video processor 120 are the video source and processor, respectively, for system 100. Computer 140 is a personal computer that is used for controlling light/video devices 150 via video processor 120 and controller 145 by use of data cables 135, as illustrated in FIG. 1A.

Lighting control station 130 is a common lighting protocol (e.g., DMX512) control station, which controls lighting devices 155 via controller 145 by use of lighting cables 125, as illustrated in FIG. 1A.

In one example, lighting control station 130 is a DMX control station. Video processor 120 receives video/data command input from computer 140 in order to process video/data from video generator 110 and output the video/data to controller 145, then to light/video devices 150. Additionally, video processor 120 acts as a pass-through for lighting control station 130's passing lighting protocol (e.g., DMX512 protocol) to controller 145, then to lighting devices 155.

Controller 145 communicates in a full duplex mode with light/video devices 150 by use of data cables 135 and in a simplex mode with the lighting devices 155 by use of lighting cables 125, as illustrated in FIG. 1A.

Light/video devices 150 are connected in series by use of video cables 115, data cables 135 and optionally, lighting cables 125, as illustrated in FIG. 1A. Likewise, a plurality of lighting devices 155 (up to a maximum of 512 per lighting control station 130) are connected in series by use of lighting cables 125, as illustrated in FIG. 1A.

Example light/video devices 150 include organic light emitting diode (OLED), lighting emitting diode (LED), and liquid crystal (LCD) displays. Example lighting devices 155 include spot lights, ambient lighting, gobo's and smoke machines. An example video cable 115 is a digital visual interface (DVI) cable. An example lighting cable 125 is an RS-485 cable. An example data cable 135 is an RS-422 cable.

Figure 1B:
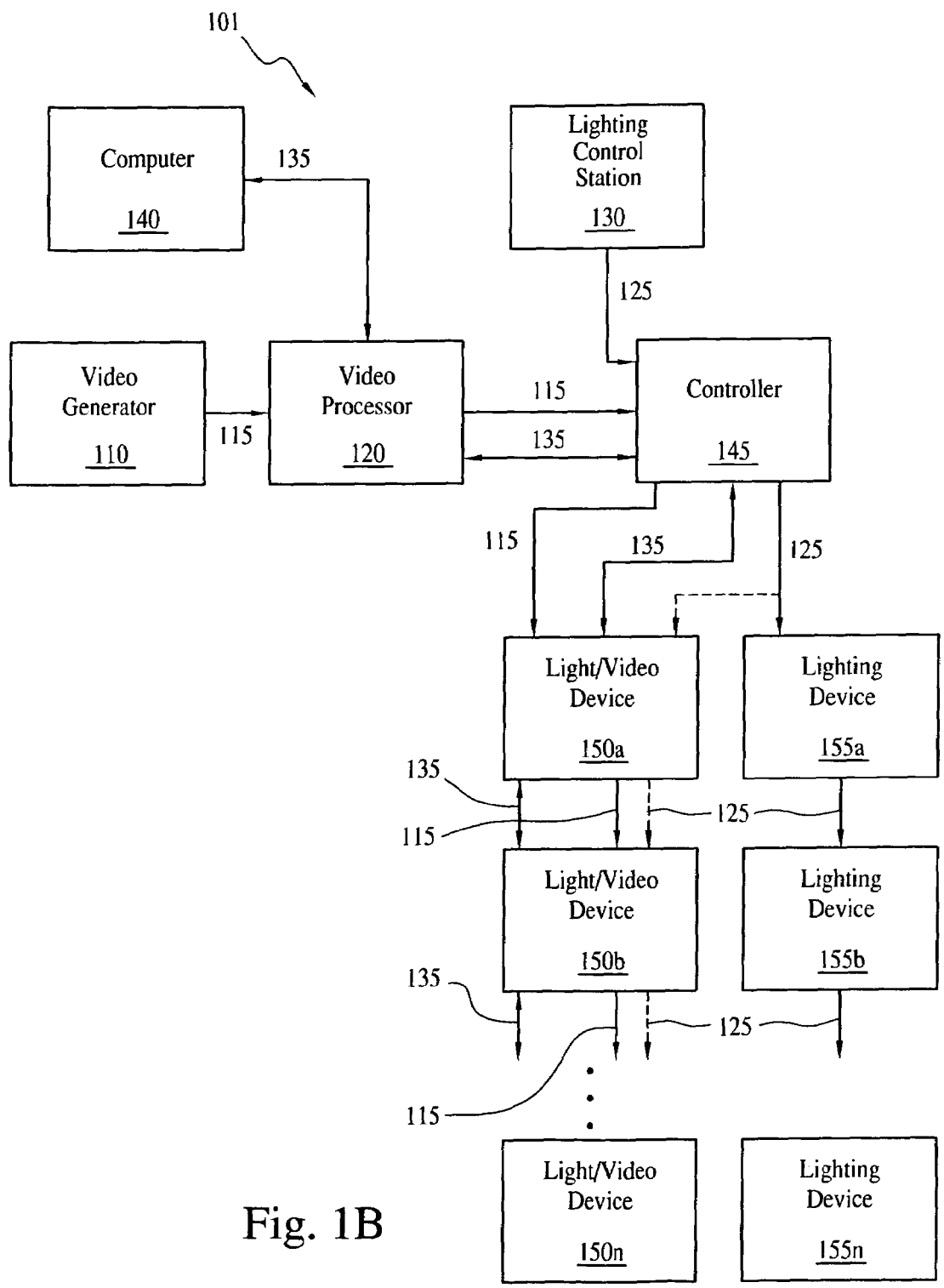
FIG. 1B illustrates a three-protocol, three-channel lighting and video system in an alternate embodiment in accordance with the invention.

With continuing reference to FIG. 1A, FIG. 1B illustrates a three-protocol, three-channel lighting and video system 101, which is an alternate embodiment of system 100.

System 101 differs from system 100 in that lighting control station 130 connects directly to controller 145 to control lighting devices 155 and that computer 140 connects to controller 145 via video processor 120 in order to control a plurality of light/video devices 150.

Figure 1C:
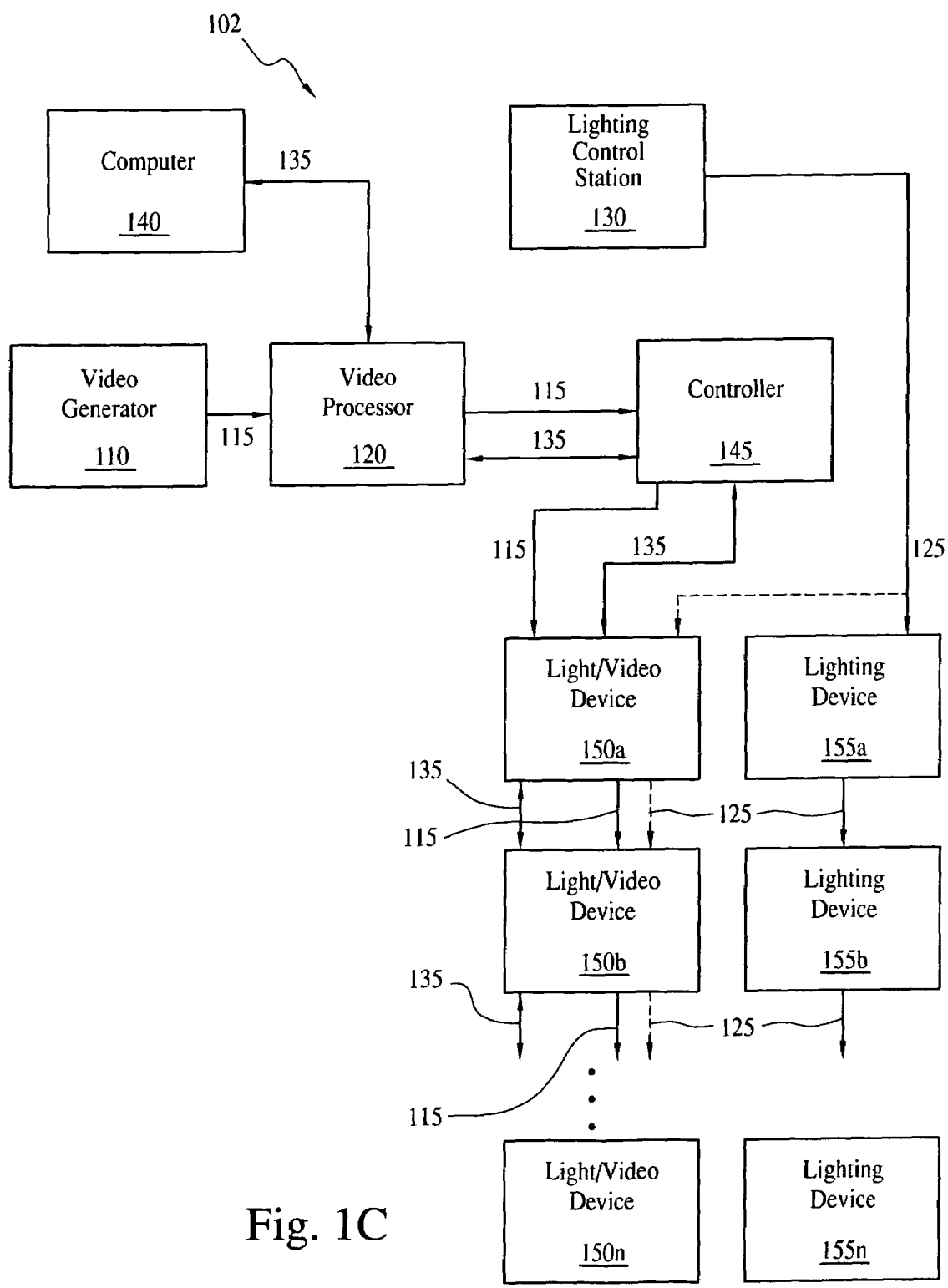
FIG. 1C illustrates a three-protocol, three-channel lighting and video system in an alternate embodiment in accordance with the invention.

With continuing reference to FIGS. 1A and 1B, FIG. 1C illustrates a three-protocol, three-channel lighting and video system 102, which is an alternate embodiment of system 100.

System 102 differs from system 100 and 101 in that lighting control station 130 connects directly to lighting devices 155.

With continuing reference to FIGS. 1A, 1B and 1C, systems 100, 101, and 102, respectively, communicate three protocols (i.e., a digital video/data protocol, a data protocol, and a common lighting protocol (e.g., DMX512)) on three different channels (i.e., video cables 115, lighting cables 125, and data cables 135). Video generator 110 and video processor 120 communicate a full duplex digital video/data protocol to each light/video device 150 serially by use of video cables 115. Example digital video/data protocol commands include video generation, still images and display on or off.

Likewise, computer 140 communicates a full duplex data protocol, which is communicated to each light/video device 150 serially by use of data cables 135. Example data protocol commands include brightness, contrast, color variation and display on or off. Example feedback commands over the video/data and data protocols include ambient illumination, ambient temperature, ambient relative humidity, device height, device orientation, preferential viewing angle, device location and repair needs. Lighting control station 130 communicates a simplex common lighting protocol (e.g., DMX512), which is communicated to each lighting device 155 serially by use of lighting cables 125. Example common lighting protocol (e.g., DMX512) commands include light brightness, lights on or off and smoke machine on or off.

Optionally, lighting control station 130 communicates a common lighting protocol (e.g., DMX512) to several or all light/video devices 150 serially.

Figure 2A:
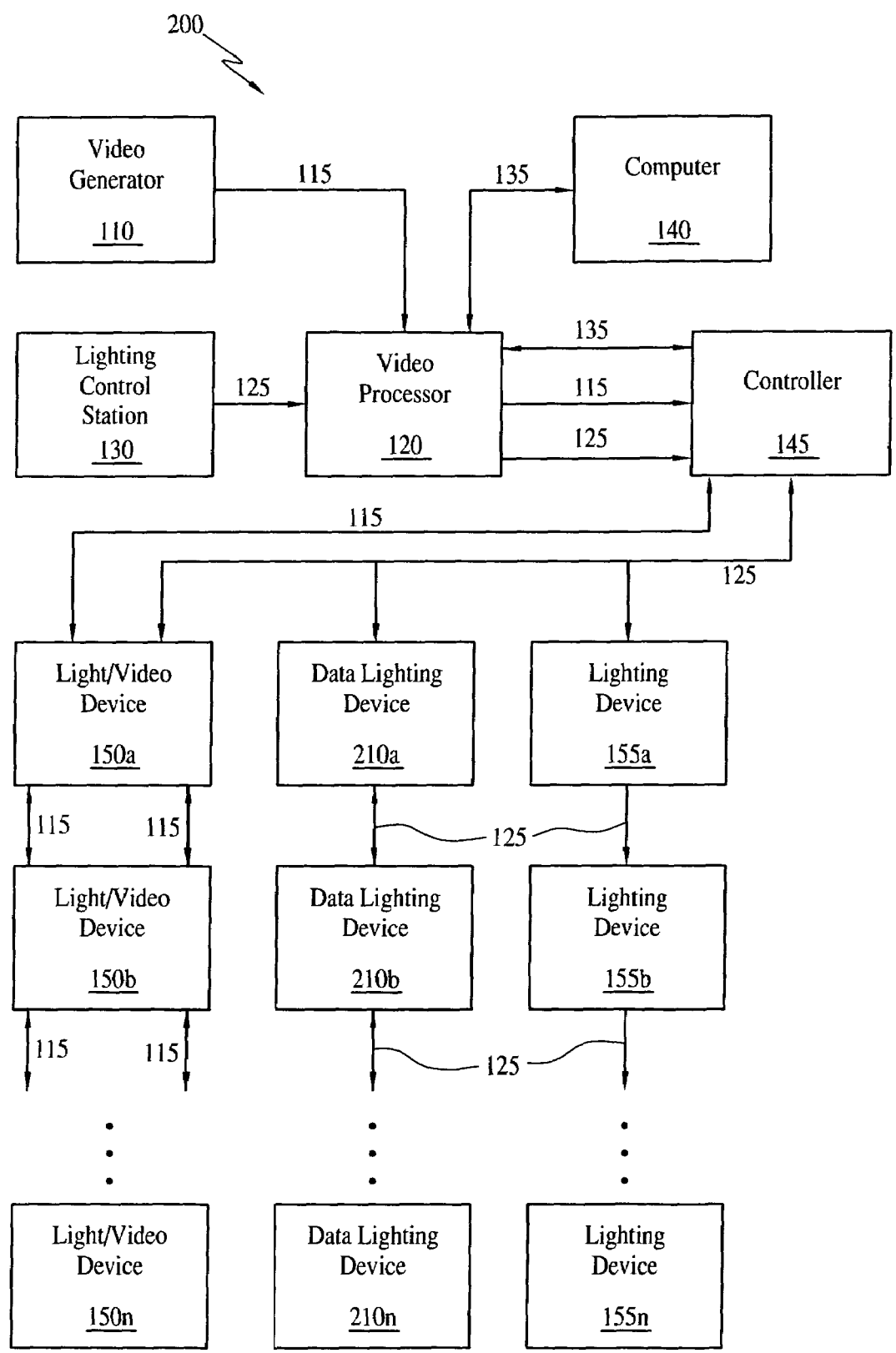
FIG. 2A illustrates a three-protocol, three-channel lighting and video system in accordance with the invention.

FIG. 2A illustrates a three-protocol, three-channel lighting and video system 200, which includes a plurality of data lighting devices 210 (i.e., 210a through 210n).

Video generator 110 and video processor 120 are the video source and processor, respectively for system 200. Controller 145 communicates in a full duplex mode with the light/video devices 150 by use of video cables 115, in a full duplex mode with data lighting devices 210 by use of lighting cables 125 and, in a simplex mode with lighting devices 155 by use of lighting cables 125, as illustrated in FIG. 2A.

Light/video devices 150 are connected in series by use of video cables 115 and lighting cables 125, as illustrated in FIG. 2A. Likewise, lighting devices 155 are connected in series by use of lighting cables 125, as illustrated in FIG. 2A. Data lighting devices 210 are connected in series by use of lighting cables 125, as illustrated in FIG. 2A.

Example data lighting devices 210 include OLED, LED and LCD lighting displays, which are not configured for video display.

Figure 2B:
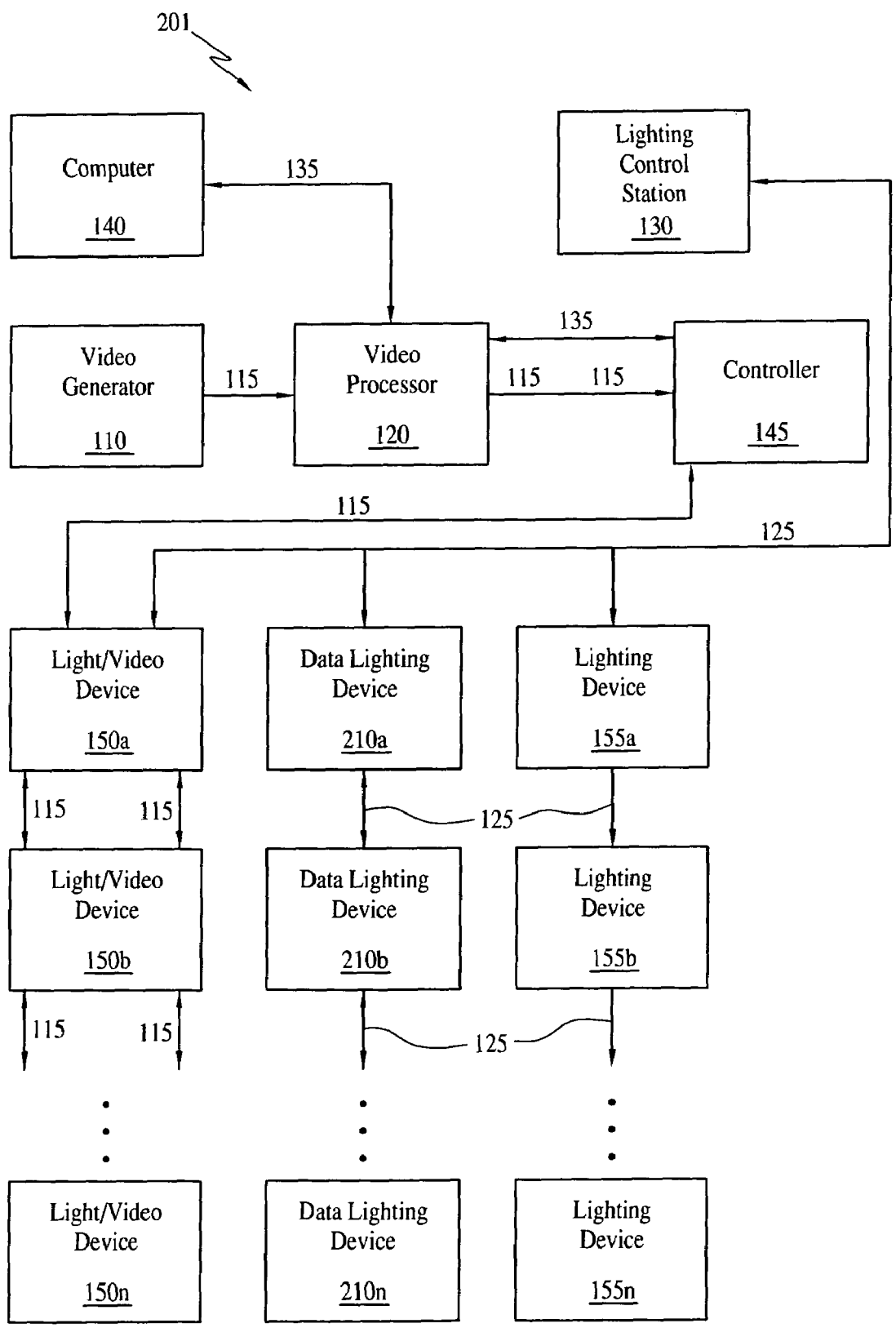
FIG. 2B illustrates a three-protocol, three-channel lighting and video system in an alternate embodiment in accordance with the invention.

With continuing reference to FIG. 2A, FIG. 2B illustrates a three protocol, three channel lighting and video system 201, which is an alternate embodiment of system 200.

System 201 differs from system 200 in that lighting control station 130 connects directly to light/video devices 150, data lighting devices 210, and lighting devices 155.

With continuing reference to FIGS. 2A and 2B, systems 200 and 201, respectively, communicate three protocols (i.e., a digital video/data protocol, a data protocol, and a common lighting protocol (e.g., DMX512)) on two different channels (i.e., video cables 115 and lighting cables 125). The data protocol is transmitted over two channels, which splits the protocol into a basic data protocol and a special data protocol.

The controller sends video/data and special data command protocol over video cables 115. The data command protocol transmits only during the vertical blanking interval (VBI) from video processor 120. Note: VBI is defined as a portion of a video signal that can carry information other than video or audio, such as closed-caption text and stock market data. Special data commands are the commands related to video. Example special data commands include color temperature and calibration.

The video/data and special data commands are transmitted over video cables 115. Controller 145 also sends common lighting command (e.g., DMX512) and basic data command protocol; the basic data commands only transmitted in-between the common lighting commands. The common lighting and basic data commands are transmitted over lighting cables 125. The video/data commands form one protocol, the common lighting commands form another protocol, and the special and basic data commands form a third protocol.

Figure 3A:
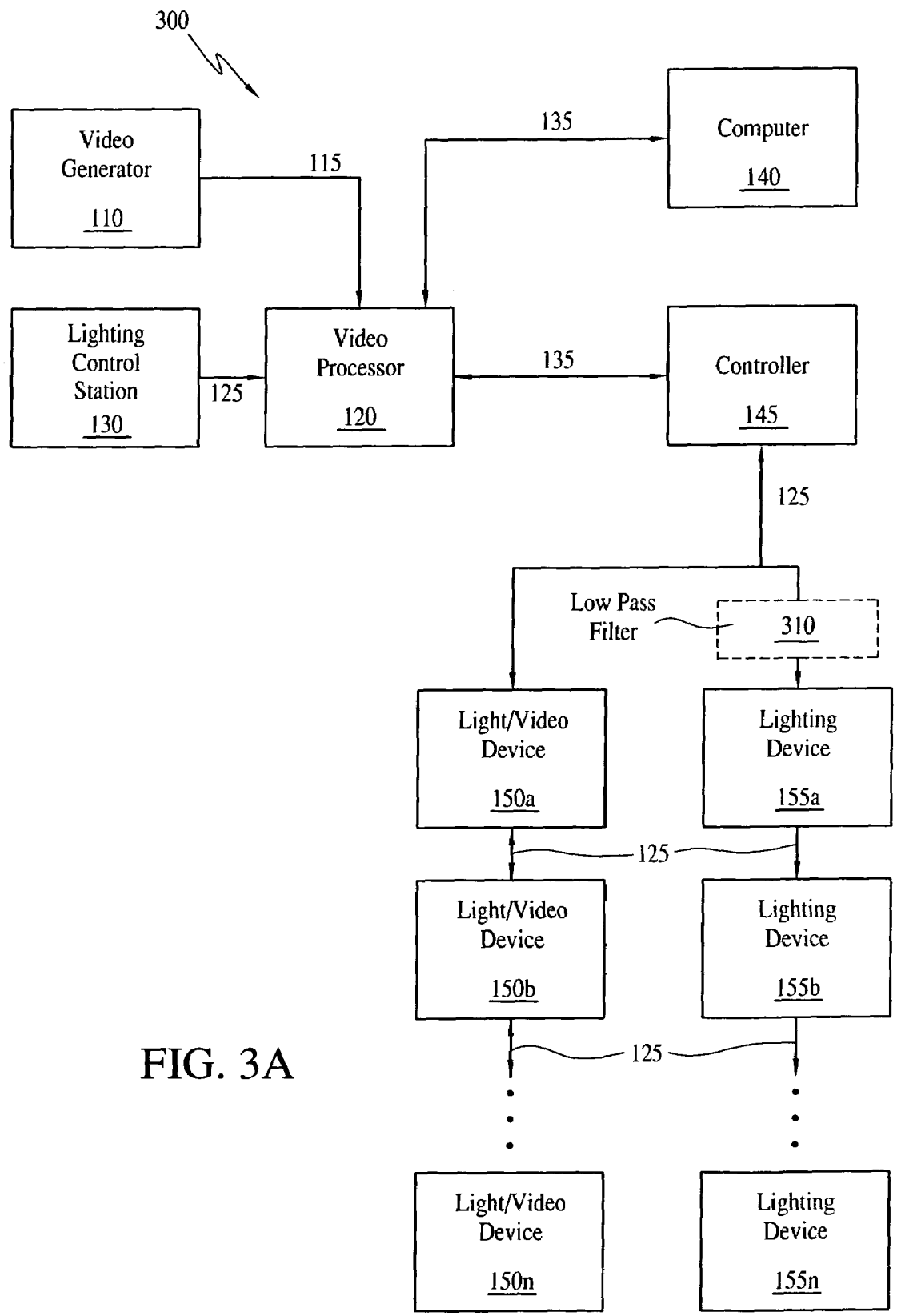
FIG. 3A illustrates a three-protocol, one channel lighting and video system.

FIG. 3A illustrates a three-protocol, one-channel lighting and video system 300, which includes low pass filter 310.

Video generator 110 and video processor 120 are the video source and processor, respectively for system 300. Computer 140 is a personal computer used for controlling the light/video devices 150 via video processor 120 and controller 145 using data cables 135, as illustrated in FIG. 3A. Controller 145 communicates in a full duplex mode with light/video devices 150 and in a simplex mode with lighting devices 155' both devices use lighting cables 125, as illustrated in FIG. 3A. A plurality of light/video devices 150 are connected in series to lighting cables 125 as illustrated in FIG. 3A. Likewise, a plurality of lighting devices 155 are connected in series by use of lighting cables 125, as illustrated in FIG. 3A.

System 300 communicates a three protocol (i.e., a digital video/data protocol, a data protocol, and a common lighting protocol (e.g., DMX512)) on one channel (i.e., lighting cables 125). Video generator 110 and video processor 120 communicate a full duplex digital video/data protocol to each light/video device 150 serially. Example digital video/data protocol commands include video generation, still images and display on or off.

Likewise, computer 140 communicates a full duplex data protocol, which is communicated to each light/video device 150 serially. Example data protocol commands include brightness, contrast, color variation, and display on or off. Example feedback commands over the video/data and data protocols include ambient illumination, ambient temperature, ambient relative humidity, device height, device orientation, preferential viewing angle, device location and repair needs.

Lighting control station 130 communicates a simplex common lighting protocol (e.g., DMX512) which is communicated to each lighting device 155 serially. Example common lighting protocol commands include light brightness, lights on or off, and smoke machine on or off.

Figure 3B:
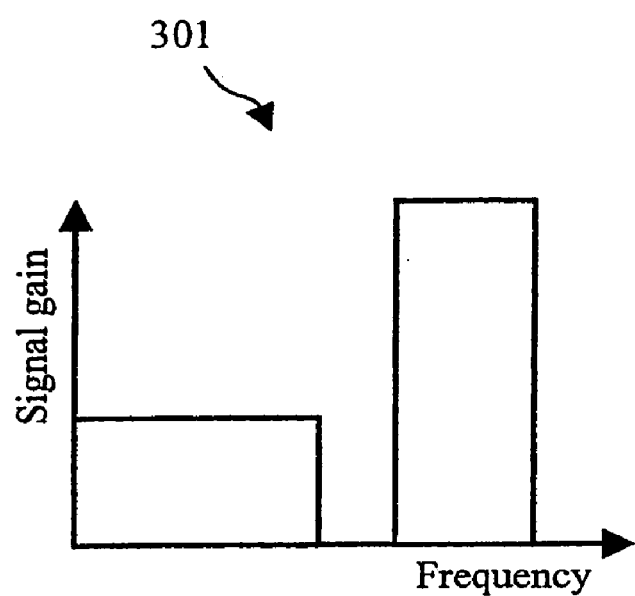
FIG. 3B illustrates a Bode plot in accordance with the invention.

With continuing reference to FIG. 3A, FIG. 3B illustrates a Bode plot 301 of the three protocols (i.e., a digital video/data protocol, a data protocol, and a common lighting protocol (e.g., DMX512)) in system 300.

With continuing reference to FIGS. 3A and 3B, all three protocols (i.e., digital video/data protocol, data protocol, and common lighting protocol (e.g., DMX512)) of system 300 are communicated over one channel serially on lighting cables 125.

The common lighting protocol (e.g., DMX512) is transmitted over a lower frequency range such as 250 kbaud/s (250 kHz); the digital video/data protocol and the data protocol are transmitted over a higher frequency range, which is greater than 5 Mhz. The common lighting protocol (e.g., DMX512) is transmitted during the same time intervals as the digital video/data protocol and the data protocol. The combination of the three protocols (i.e., digital video/data protocol, data protocol, and common lighting protocol (e.g., DMX512)) is called an integrated protocol. Optionally, a low pass filter 310 is used to filter the higher frequency digital video/data protocol and the data protocol to cancel any high frequency noise effects to lighting devices 155. In one example, filter 310 is a resistor-capacitor network, low pass filter of 1K and 330 pF.

Figure 4:
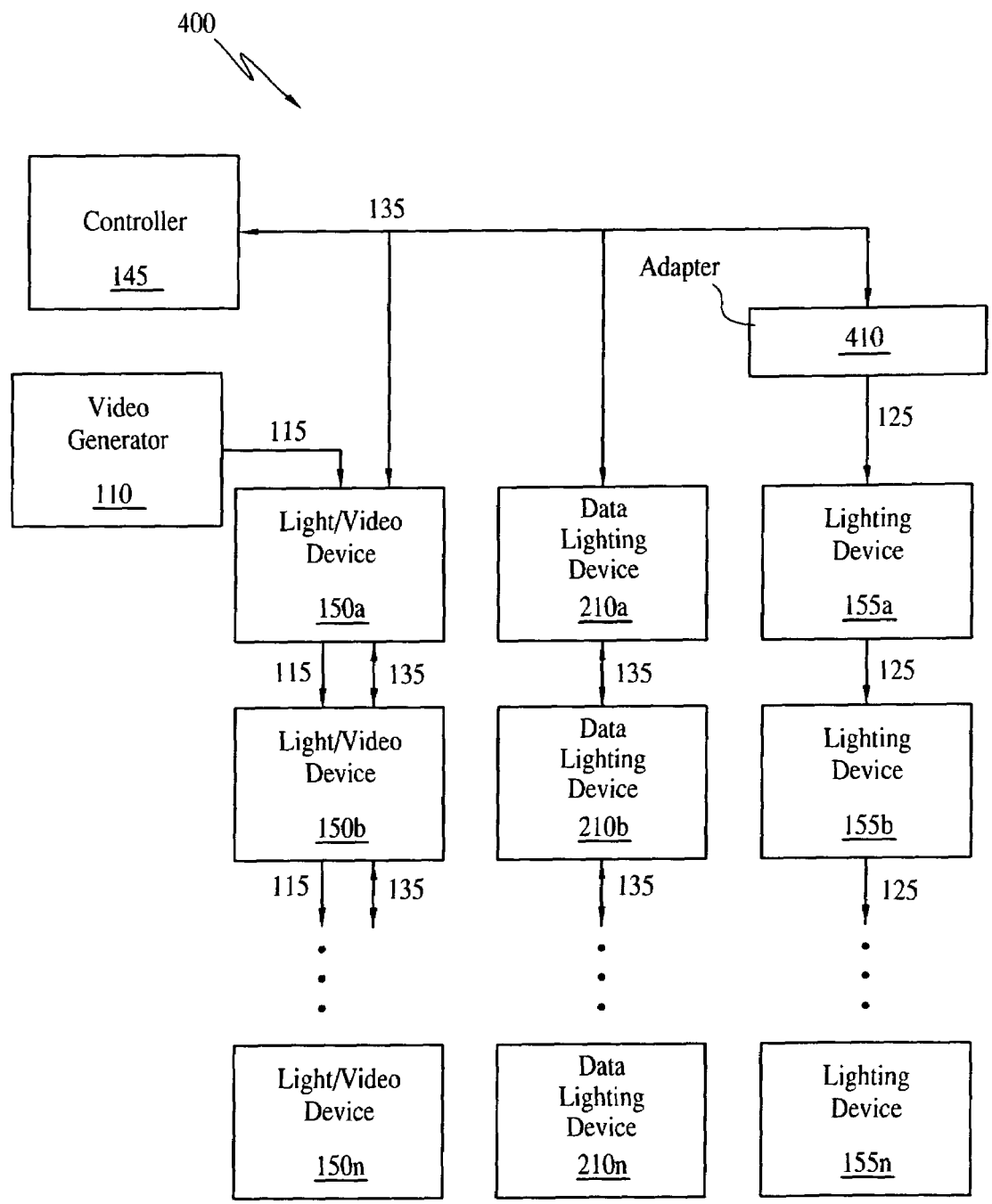
FIG. 4 illustrates a three-protocol, two channel lighting and video system in accordance with the invention.
Figure 5:
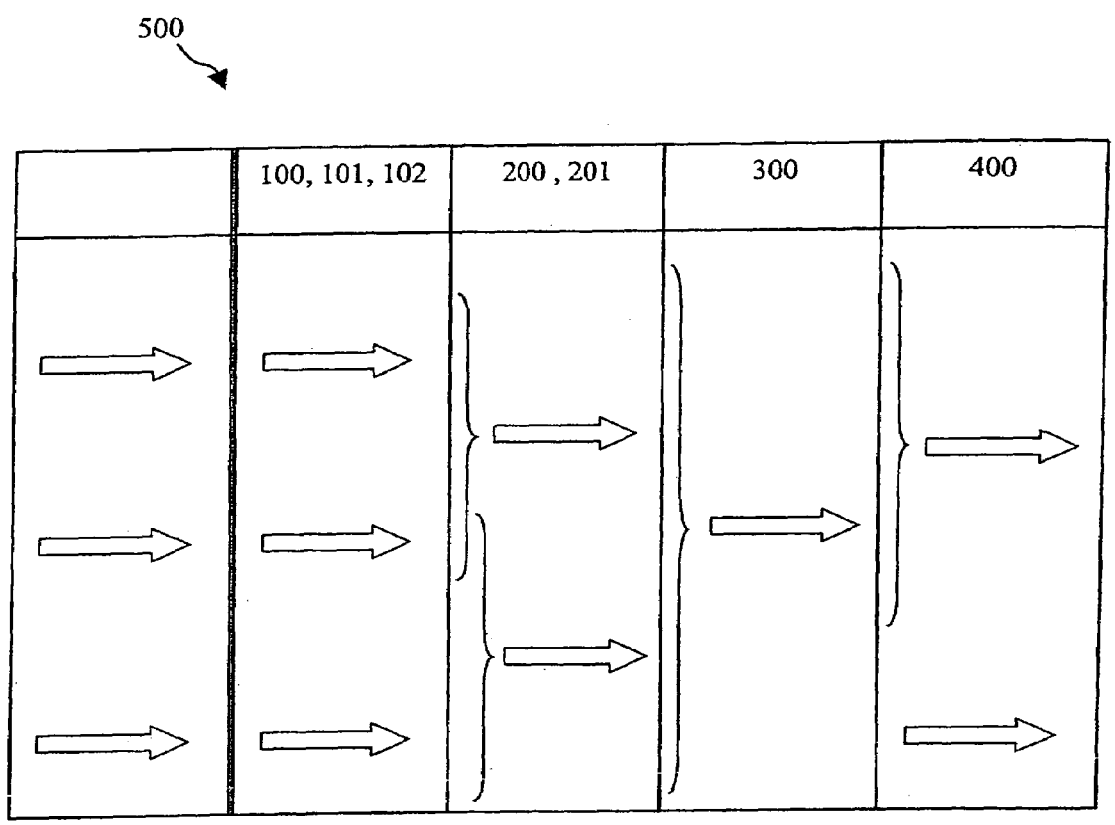
FIG. 5 illustrates a table in accordance with the invention.

FIG. 4 illustrates a three-protocol, two-channel lighting and video system 400, which includes an adapter 410.

With continuing reference to FIGS. 2A and 4, system 400 is a special case of system 200, in that the data protocol and common lighting protocol (e.g., DMX512) are transmitted on one channel and the digital video/data protocol on the other channel. The data protocol is transmitted from controller 145 directly to light/video devices 150 and to data lighting devices 210 and indirectly to lighting devices 155 via adapter 410. The data protocol and common lighting protocol (e.g., DMX512) transmitted over the same channel forms a new protocol called extended lighting protocol.

Adapter 410 translates the data protocol into a common lighting protocol (e.g., DMX512) for lighting devices 155. In one example, adapter 410 is formed of receiver and decoder logic, mainly translating RS232 commands into DMX512 protocol.

With continuing reference to FIGS. 1A, 1B, 1C, 2A, 2B, 3A, 3B, and 4, FIG. 5 illustrates a table 500, which details the variations among systems 100, 101, 102, 200, 201, 300, and 400. Systems 100, 101, and 102 communicate three protocols (i.e., a digital video/data protocol, a data protocol, and a common lighting protocol (e.g., DMX512)) on three different channels. Systems 200 and 201 communicate three protocols (i.e., a digital video/data protocol, a data protocol, and a common lighting protocol (e.g., DMX512)) on two different channels.

The data protocol is transmitted over two channels, which splits the protocol into a basic data protocol and a special data protocol. The basic data protocol is transmitted in between the common lighting protocol commands on the same channel. The special data protocol commands are transmitted during the VBI of the video/data protocol commands over the same channel. System 300 communicates three protocols (i.e., a digital video/data protocol, a data protocol, and a common lighting protocol (e.g., DMX512)) on one channel, which forms an integrated protocol. The video/data and data protocol, commands are transmitted at a higher frequency than the common lighting protocol commands over the same channel.

System 400 communicates three protocols (i.e., a digital video/data protocol, a data protocol, and a common lighting protocol (e.g., DMX512)) on two channels. The data protocol is communicated to light/video devices 150 and lighting devices 155, with the data protocol being translated in a common lighting protocol for lighting devices 155 through adapter 410. The video/data protocol is transmitted over a separate channel.

Systems 100, 101, 102, 200, 201, 300, and 400 are not limited to the detailed setups, as illustrated in FIGS. 1A, 1B, 1C, 2A, 2B, 3A, 3B, and 4, respectively, but may be altered to accommodate custom setup requirements. For example, system 400 may have video generator 110 and light/video devices 150 removed in order to provide a system 400 without video capability.

The present invention is in no way limited to the embodiments described above and represented in the drawings, but such a control system according to the invention for lighting and video devices may be realized in different shapes and dimensions, without departure from the scope of the invention.

The invention claimed is:

1. A control system for lighting and video devices, wherein said control system comprises:
   at least one video device;
   at least one lighting device; and
   a software protocol, configured for communicating three different protocols, to said video and lighting devices; wherein said three protocols include a digital video/data protocol, a common lighting protocol and a data protocol, wherein said protocols are communicated through three different channels, each over a different cable, namely over a video cable and a data cable, connected to said video device, and over a lighting cable, which is connected to said lighting device and optionally to said video device.

2. The control system according to claim 1, wherein said video cable, data cable and lighting cable connect a plurality of video devices, and respective lighting devices.

3. The control system according to claim 1, further comprising a video generator, a video processor and a controller, wherein said video cable connects the video generator to said video processor, said controller and said video device, respectively.

4. The control system according to claim 1, further comprising a computer, a video processor and a controller, wherein said data cable connects said computer to said video processor, said controller and said video device, respectively.

5. The control system according to claim 1, further comprising a lighting control station, a video processor and a controller, wherein said lighting cable connects said lighting control station to said video processor, said controller and said lighting device, respectively.

6. The control system according to claim 1, further comprising a lighting control station and a controller, wherein said lighting cable connects said lighting control station to said controller and said lighting device, respectively.

7. The control system according to claim 1, further comprising a lighting control station which is coupled directly to said lighting device, by means of said lighting cable.

8. The control system according to claim 1, wherein said video device is also connected to said lighting cable.

9. The control system according to claim 1, wherein said system further comprises at least one data lighting device, which is connected to a lighting control station and/or to a controller.

10. The control system according to claim 9, wherein said system comprises a plurality of video devices, data lighting devices and lighting devices.

11. The control system according to claim 9, wherein said system comprises a data cable, a computer, a video processor and a controller; and wherein said data cable connects said computer to said video processor and to said controller, respectively.

12. The control system according to claim 11, further comprising a video cable and a video generator, wherein said video cable connects said video generator to said video processor, to said controller and to said video device, respectively.

13. The control system according to claim 11, further comprising a lighting cable and a lighting control station, wherein said lighting cable connects said lighting control station to said video processor and to said controller, respectively, and wherein said controller is further connected by means of said lighting cable to said lighting device, to said data lighting device and to said video device.

14. The control system according to claim 11, further comprising a lighting cable and a lighting control station, wherein said lighting cable connects said lighting control station to said lighting device, to said data lighting device and to said video device.

15. The control system according to claim 9, further comprising a video cable and a video generator, wherein said video generator is connected directly to said video device by means of said video cable.

16. The control system according to claim 9, further comprising a data cable, a controller and an adapter, wherein said data cable connects said controller to said video device, to said data lighting device and to said adapter.

17. The control system according to claim 16, further comprising a lighting cable, wherein said adapter is connected to said lighting device by means of said lighting cable.

18. The control system according to claim 1, further comprising a video cable, a video generator, a video processor, a lighting cable and a lighting control station, wherein said video cable connects said video generator to said video processor; and wherein said lighting cable, connects said lighting control station to said video processor.

19. The control system according to claim 18, wherein said system comprises a plurality of video and lighting devices.

20. The control system according to claim 18, further comprising a data cable, a computer and a controller, wherein said computer is connected by means of said data cable to said video processor and to said controller, respectively.

21. The control system according to claim 20, wherein said controller is connected to said video device and to said lighting device by means of a lighting cable.

22. The control system according to claim 21, wherein between said controller and said lighting device a filter is provided.

23. A method for controlling lighting and video devices within a common three-protocol control system, comprising using a software protocol, which is configured for communicating three different protocols to said lighting and video devices; wherein said protocols include a first data protocol, a second common lighting protocol and a third video/data protocol, wherein said protocols are communicated through three separate channels.

24. A method for controlling lighting and video devices within a common three-protocol control system, comprising using a software protocol, which is configured for communicating three different protocols to said lighting and video devices; including a first data protocol, a second common lighting protocol and a third video/data protocol, wherein the data protocol is split into a basic data protocol and a special data protocol, which protocols are communicated over two different channels.

25. The method according to claim 24, wherein said basic data protocol is transmitted through the channel of the common lighting protocol and is transmitted in-between the common lighting protocol commands.

26. The method according to claim 24, wherein said special data protocol is transmitted through the video/data channel and is transmitted during vertical blanking interval (VBI) of the video/data protocol commands.

27. A method for controlling lighting and video devices within a common three-protocol control system, comprising using a software protocol, which is configured for communicating three different protocols to said lighting and video devices; wherein the video/data and data protocol commands are communicated through the channel of the common lighting protocol, at a higher frequency than the common lighting protocol commands.

28. A method for controlling lighting and video devices within a common three-protocol control system, comprising using a software protocol, which is configured for communicating three different protocols to said lighting and video devices; wherein said protocols include a first data protocol, a second common lighting protocol and a third video/data protocol, wherein said data protocol is communicated to a plurality of video devices and a plurality of lighting devices, and wherein said data protocol is translated in a common lighting protocol for the lighting devices through an adapter.

* * * * *